United States Patent
Malviya et al.

(10) Patent No.: US 12,504,578 B2
(45) Date of Patent: Dec. 23, 2025

(54) MULTICORE OPTICAL FIBER AND MULTICORE OPTICAL FIBER CABLE

(71) Applicant: Sterlite Technologies Limited, Gurugram (IN)

(72) Inventors: Apeksha Malviya, Gurugram (IN); Srinivas Reddy Munige, Gurugram (IN); Saurabh Kapoor, Gurugram (IN); Anand Pandey, Gurugram (IN)

(*) Notice: Subject to any disclaimer, the term of this patent is extended or adjusted under 35 U.S.C. 154(b) by 267 days.

(21) Appl. No.: 18/340,869

(22) Filed: Jun. 25, 2023

(65) Prior Publication Data
US 2024/0280745 A1    Aug. 22, 2024

(30) Foreign Application Priority Data
Feb. 20, 2023    (IN) .............................. 202311011417

(51) Int. Cl.
*G02B 6/036* (2006.01)
*G02B 6/02* (2006.01)
*G02B 6/44* (2006.01)

(52) U.S. Cl.
CPC ..... *G02B 6/03694* (2013.01); *G02B 6/02042* (2013.01); *G02B 6/4403* (2013.01)

(58) Field of Classification Search
CPC ............ G02B 6/03694; G02B 6/02042; G02B 6/4403
USPC ......................................................... 385/114
See application file for complete search history.

(56) References Cited

U.S. PATENT DOCUMENTS

| | | | |
|---|---|---|---|
| 2021/0294027 A1* | 9/2021 | Bennett | G02B 6/0288 |
| 2022/0066091 A1* | 3/2022 | Hayashi | G02B 6/02042 |
| 2022/0283362 A1* | 9/2022 | Bennett | G02B 6/0281 |
| 2022/0326432 A1* | 10/2022 | Li | G02B 6/036 |
| 2023/0251445 A1* | 8/2023 | Sato | G02B 6/441 385/114 |
| 2023/0266520 A1* | 8/2023 | Oda | G02B 6/02042 385/126 |

* cited by examiner

Primary Examiner — Jerry M Blevins
(74) Attorney, Agent, or Firm — Steven R. Fairchild (57) ABSTRACT

The present invention relates to a multi-core optical fiber having a plurality of cores (102) and a cladding (108) surrounding the plurality of cores (102). The cladding (108) has a peripheral cladding layer (108b) that is down doped such that a leakage loss of the multi-core optical fiber (100) is less than 0.001 Decibel/Kilometer (dB/Km) at a wavelength 1550 nanometers (nm).

16 Claims, 8 Drawing Sheets

MULTICORE OPTICAL FIBER AND MULTICORE OPTICAL FIBER CABLE

CROSS-REFERENCE TO RELATED APPLICATIONS

This application claims the benefit of Indian Application No. 202311011417 titled "MULTICORE OPTICAL FIBER AND MULTICORE OPTICAL FIBER CABLE" filed by the applicant on Feb. 20, 2023, which is incorporated herein by reference in its entirety.

FIELD OF THE INVENTION

Embodiments of the present invention relate to the field of optical fiber communications, and more particularly to a multicore optical fiber with a down doped peripheral cladding for an optical fiber communication system.

DESCRIPTION OF THE RELATED ART

In recent years, the high-speed development of fiber optic communication and optical-fiber network promotes to realize the optical fiber of high-capacity transmission as grinding Study carefully hot spot, such as less fundamental mode optical fiber, multi-core optical fiber. Wherein, the multi-core optical fiber based on space division multiplexing cannot increase optical cable laying sky Between and expense in the case of realize dilatation to optical fiber, preferably overcome the limitation of single mode optical fiber transmission capacity. Study multi-core optical Fiber will be with important application prospect. Multi-core optical fiber is the optical fiber that multiple fiber cores are accommodated in the same covering, passing through multiple fiber core propagating optical signals.

Multi-core optical fibers have a plurality of cores extending along the multi-core optical fibers, in a cladding are available as an optical transmission line which is capable of transmitting information. Such multi-core optical fibers are designed to have lower diameters. However, in a reduced diameter optical fiber, an outside cladding thickness is very less. If the outside cladding is made up of a pure silica glass material, the outside cladding will contribute more leakage loss and micro bending loss. Especially in multi-core fiber, the outside cladding thickness will be significantly low that makes the optical fiber impractical due to leakage losses that further results in the multi-core optical fiber being impractical for communication and/or data center applications.

Prior art reference CN108181683A discloses a kind of low crosstalk big mode field area multi-core optical fiber which includes multiple core regions in which one core region is surrounded by a first clad region formed of silicon dioxide, a second clad region surrounding the first clad region and the other core regions is doped with fluorine.

Another prior art reference US20220283362A1 discloses a multicore optical fiber including an inner glass region having multiple core regions surrounded by a common outer cladding. The inner glass region further has at least one marker. Each core region of the multicore optical fiber consists of a Germania-doped silica core and a fluorine-doped silica trench.

Yet another prior art reference U.S. Ser. No. 10/031,284B2 discloses a multicore fiber (MCF) comprising a core group consisting of eight or more cores and an inner cladding group consisting of inner claddings each of which individually surrounds a corresponding core out of the eight or more cores, a trench group consisting of trenches each of which individually surrounds a corresponding inner cladding out of the inner claddings. The MCF comprises a common cladding individually surrounding each of the trenches. The cores and the inner claddings are composed of $GeO_2$-doped silica glass. The trenches are composed of F-doped silica glass and the common cladding is composed of a silica-based glass.

However, the prior art techniques fall short of effectively optimizing the Mode Field Diameter (MFD) value in a range as required and reduce the cross talk in a reduced diameter multicore optical fiber. Thus, there still remains a need to provide a multi-core optical fiber which would have an optimized design with good macro-bend characteristics, less leakage loss, low attenuation, low crosstalk, better strength, and reduced diameter to overcome the aforementioned problems of the traditional optical fibers. Hence, the present invention provides a multi-core optical fiber that has a reduced leakage loss and reduced micro bending loss which is necessary for a multi-core optical fiber due to low thickness of a peripheral cladding layer of the multi-core optical fiber.

SUMMARY OF THE INVENTION

Embodiments of the present invention relates to a multi-core optical fiber comprising a plurality of cores and a cladding that surrounds the plurality of cores. In particular, the cladding further comprises a peripheral cladding layer which is down doped such that a leakage loss of the multi-core optical fiber is less than 0.001 dB/Km at a wavelength 1550 nm.

In accordance with an embodiment of the present invention, the peripheral cladding layer has a thickness in a range of 3 μm to 6 μm.

In accordance with an embodiment of the present invention, the cladding further comprises a mid-cladding layer, wherein the mid-cladding layer is made up of pure silica glass. The mid-cladding layer comprises a marker such that a refractive index of the marker is at least one of higher and lower with respect to a refractive index of the mid-cladding layer.

In accordance with an embodiment of the present invention, a marker is disposed at a distance between 20 μm to 37.5 μm from a central axis of the multi-core optical fiber. The shape of the marker is one of, a circular shape, a cylindrical shape, an elliptical cylindrical shape, and a triangular cylindrical shape.

In accordance with an embodiment of the present invention, the multi-core optical fiber further comprises a plurality of buffer layers and a plurality of trench layers. The buffer layers surround the plurality of cores. In particular, the plurality of buffer layers are undoped. Further, the plurality of trench layers surrounds the plurality of buffer layers. The plurality of trench layers are down doped.

In accordance with an embodiment of the present invention, the plurality of cores are up doped with an up dopant, wherein the up dopant is one of Germanium (Ge) and Chlorine (Cl)

In accordance with an embodiment of the present invention, the peripheral cladding layers are down doped with a down dopant, wherein the down dopant is Fluorine (F).

In accordance with an embodiment of the present invention, a diameter of the multi-core optical fiber without a coating layer is in a range of 80 micrometers (μm) to 110 μm with a tolerance of +1 μm. And the diameter of the multi-core optical fiber with a coating layer is in the range of 150 μm to 200 μm.

In accordance with an embodiment of the present invention, the multi-core optical fiber has at least one of:
- a Mode Field Diameter (MFD) of the multi-core optical fiber is in a range of 7.6 µm to 8.6 µm at a wavelength of 1550 nm;
- a macro bend loss of the multi-core optical fiber
  (i) at a wavelength of 1550 nm and a bend radius of 5 mm is 0.15 dB/turn,
  (ii) at a wavelength of 1625 nm and at a bend radius of 5 mm is 0.45 dB/turn,
  (iii) at a wavelength of 1550 nm and a bend radius of 7.5 mm is 0.08 dB/turn, and
  (iv) at a wavelength of 1625 and a bend radius of 7.5 mm is 0.025 dB/turn;
- a Coefficient of Thermal Expansion (CTE) is in a range of $6 \times 10^{-7}$ to $1 \times 10^{-7}$ $C^{-1}$; and an attenuation is
  (i) less than 0.35 dB/KM at 1310 nm wavelength and
  (ii) less than 0.25 dB/KM at 1550 nm wavelength.

In accordance with an embodiment of the present invention, the multi-core optical fiber has at least 4 cores such that a core to core spacing of each pair of cores of the plurality of cores is in a range of 20 µm to 35 µm.

In accordance with an embodiment of the present invention, a crosstalk of the multi-core optical fiber is less than −30 dB at a wavelength of 1550 nm.

In accordance with an embodiment of the present invention, a multi-core optical fiber cable incorporates one or more multi-core optical fiber ribbons in which a plurality of multi-core optical fibers are intermittently bonded. Further, the multi-core optical fiber ribbon is incorporated with spirally twisted.

In accordance with an embodiment of the present invention, the multi-core optical fiber cable has an attenuation of less than 0.4 dB/km at a wavelength 1310 nm and the multi-core optical fiber cable has an attenuation of less than 0.3 dB/km at a wavelength 1550 nm.

In accordance with an embodiment of the present invention, the multi-core optical fiber cable has a minimum average bending radius that is 10 to 15 times of a predefined diameter of the multi-core optical fiber cable in a fiber longitudinal direction.

In accordance with an embodiment of the present invention, the multi-core optical fiber has an increased strength by virtue of a doping profile of a peripheral cladding layer which is critical for a reduced diameter optical fiber.

In accordance with an embodiment of the present invention, the multi-core optical fiber that has a plurality of buffer layer made up of a pure silica glass material and a plurality of trench layer along with the plurality of buffer layer that may facilitate to achieve a delta value that is in reference to a core of the multi-core optical fiber to require an optical signal to guide in the core to achieve total internal reflection.

In accordance with an embodiment of the present invention, the multi-core optical fiber that enables next-level cable designs and bend performance, while streamlining field optical time domain reflectometer (OTDR) testing protocols.

In accordance with an embodiment of the present invention, the reduced diameter multi-core optical fiber with low micro bending loss to constitute an intermittently bonded multi-core fiber (MCF) ribbon which can be incorporated in a multi-core optical fiber cable.

These and other aspects herein will be better appreciated and understood when considered in conjunction with the following description and the accompanying drawings. It should be understood, however, that the following descriptions are given by way of illustration and not of limitation. Many changes and modifications is made within the scope of the invention herein without departing from the spirit thereof.

BRIEF DESCRIPTION OF THE DRAWINGS

So that the manner in which the above-recited features of the present invention is understood in detail, a more particular description of the invention, briefly summarized above, is had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

The invention herein will be better understood from the following description with reference to the drawings, in which.

The optical fiber is illustrated in the accompanying drawings, which like reference letters indicate corresponding parts in the various figures. It should be noted that the accompanying figure is intended to present illustrations of exemplary embodiments of the present invention. This figure is not intended to limit the scope of the present invention. It should also be noted that the accompanying figure is not necessarily drawn to scale.

DETAILED DESCRIPTION OF THE INVENTION

The principles of the present invention and their advantages are best understood by referring to FIG. 1A to FIG. 3B. In the following detailed description, numerous specific details are set forth in order to provide a thorough understanding of the embodiment of the invention as illustrative or exemplary embodiments of the invention, specific embodiments in which the invention is practiced are described in sufficient detail to enable those skilled in the art to practice the disclosed embodiments. However, it will be obvious to a person skilled in the art that the embodiments of the invention is practiced with or without these specific details. In other instances, well-known methods, procedures and components have not been described in detail so as not to unnecessarily obscure aspects of the embodiments of the invention.

The following detailed description is, therefore, not to be taken in a limiting sense, and the scope of the present invention is defined by the appended claims and equivalents thereof. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. References within the specification to "one embodiment," "an embodiment," "embodiments," or "one or more embodiments" are intended to indicate that a particular feature, structure, or characteristic described in connection with the embodiment is included in at least one embodiment of the present invention.

Although the terms first, second, etc. is used herein to describe various elements, these elements should not be limited by these terms. These terms are generally only used to distinguish one element from another and do not denote any order, ranking, quantity, or importance, but rather are used to distinguish one element from another. Further, the terms "a" and "an" herein do not denote a limitation of quantity, but rather denote the presence of at least one of the referenced items.

The conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps.

Disjunctive language such as the phrase "at least one of X, Y, Z," unless specifically stated otherwise, is otherwise understood with the context as used in general to present that an item, term, etc., is either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The Following Brief Definition of Terms Shall Apply Throughout the Present Invention An optical fiber refers to a medium associated with transmission of information over long distances in the form of light pulses. The optical fiber uses light to transmit voice and data communications over long distances when encapsulated in a jacket/sheath. The optical fiber is of ITU.T G.657.A2 category. Alternatively, the optical fiber is of ITU.T G.657.A1 or G.657.B3 or G.652.D or other suitable category or the optical fiber is a multi-core optical fiber. The ITU.T, stands for International Telecommunication Union-Telecommunication Standardization Sector, is one of the three sectors of the ITU. The ITU is the United Nations specialized agency in the field of telecommunications and is responsible for studying technical, operating and tariff questions and issuing recommendations on them with a view to standardizing telecommunications on a worldwide basis. The optical fiber is a bend insensitive fiber that has less degradation in optical properties or less increment in optical attenuation during multiple winding/unwinding operations of an optical fiber cable. The optical fiber comprises one or more cores, one or more clads or claddings and/or one or more coating layers, where a core is a light-carrying portion of the optical fiber using total internal reflection in which optical signal is confined and a cladding is a region that prevents loss of signal by preventing any signal leakage from the core. The refractive index of the cladding is lower than the refractive index of core in order to cause reflection within the core so that light waves are transmitted through the optical fiber. The coating protects the optical fiber from moisture and physical damage and also improves the strength in terms of heat and cold resistance.

Term "core" as used herein defines a cylindrical structure present in an optical fiber that is configured to guide an optical signal inside the optical fiber.

Term "cladding layer" as used herein defines one or more layered structure covering the core of an optical fiber from outside that is configured to possess a lower refractive index than a refractive index of the core to facilitate total internal reflection of the optical signal inside the optical fiber. Further, the cladding layer of the optical fiber may include an inner cladding layer coupled to an outer surface of the core of the optical fiber and an outer cladding layer coupled to the inner cladding from outside.

Term "multi-core optical fiber" as used herein defines an optical fiber that includes multiple core regions, each capable of communicating the optical signals between transceivers including transmitters and receivers which may allow for parallel processing of multiple optical signals. The multi-core optical fiber is used for Wavelength Division Multiplexing (WDM) or multi-level logic or for other parallel optics of spatial division multiplexing. The multi-core optical fiber may advantageously be aligned with and connected to various devices in a manner that allows for easy and reliable connection so that the plurality of cores is aligned accurately at opposite terminal ends with like communication paths in connecting devices. In general, the optical fibers are used in telecommunications to transmit telephone signals, internet communication, cable television signals and the like.

Term "marker" as used herein defines a structure used to identify position of multiple cores of a multi-core optical fiber. The marker is arranged along the optical fiber axis in parallel to the cores in a mid-cladding layer. The refractive index of the marker is different and can be greater or lesser than the refractive index of the mid-cladding layer.

Term "refractive index" as used herein defines a measure of change of speed of the optical signal from one medium to another and is particularly measured in reference to speed of light in vacuum. More specifically, the refractive index facilitates measurement of bending of the optical signal from one medium to another medium.

Term "refractive index profile" as used herein is referred to as a distribution of refractive indexes in an optical fiber from a core to an outmost cladding layer of the optical fiber. Based on the refractive index profile, the optical fiber is configured as a step index fiber. The refractive index of the core of the optical fiber is constant throughout the optical fiber and is higher than the refractive index of the cladding layer. Further, the optical fiber is configured as a graded index fiber such that the refractive index of the core gradually varies as a function of the radial distance from the center of the core.

Term "relative refractive index" as used herein is defined as, where ni is maximum refractive index in region i of an optical fiber unless otherwise specified, and n is the average refractive index of an undoped region of the optical fiber. As used herein, the relative refractive index is represented by Δ and its values are given in units of "%", unless otherwise specified. In some cases where the refractive index of a region is less than the average refractive index of an undoped region, the relative refractive index percentage is negative, and the region is referred as a trench region.

Term "down doping" as used herein refers to adding doping materials to facilitate decrease in a refractive index of a particular layer or part of an optical fiber. The materials configured to facilitate down doping are known as down dopants.

Term "up doping" as used herein refers to adding doping materials to facilitate increase in a refractive index of a particular layer or part of an optical fiber. The materials configured to facilitate up doping are known as up dopants.

Term "undoped" as used herein refers to a region of an optical fiber that contains a dopant not intentionally added to the region during fabrication, but Term does not exclude low levels of background doping that is inherently incorporated during the fabrication process. Such background doping levels are low in that they have an insignificant effect on the refractive index of the undoped region.

Term "reduced diameter optical fiber" as used herein refers to an optical fiber as disclosed in the present invention having a diameter range of 80 micrometers (µm) to 110 µm (generally less than 125 µm) with a tolerance of +1 µm. Such optical fibers have very less peripheral clad thickness. The reduced diameter optical fiber significantly increases the packing density of the optical fiber cables.

Term "leakage loss" as used herein refers to a loss due to mode leak in an optical fiber that adds to an attenuation of the optical fiber. The Leakage loss is calculated using finite element analysis method where the losses are calculated in the optical fiber in straight condition.

Term "bare fiber" as used herein refers to an uncoated fiber drawn by melting a preform in draw tower. Further, the bare fiber is coated with a primary coating and a secondary coating.

Term "Mode Field Diameter (MFD)" as used herein refers to a diameter of a spread of electric field distribution in propagation mode (light path). An optical signal usually passes through a core of an optical fiber. Generally, the MFD is slightly greater than the core diameter.

Term "Cable Cutoff" as used herein refers to a parameter of a single-mode optical fiber. Specifically, an optical fiber cannot be a single-mode fiber if it is used at a wavelength shorter than a cable cut-off wavelength, which is determined by optical fiber structure, involving refraction index distribution and core diameter.

Term "macro bend loss" as used herein refers to losses induced in bends around mandrels (or corners in installations), generally more at a cable level or for an optical fiber. The macro bend loss occurs when the fiber cable is subjected to a significant amount of bending above a critical value of curvature. The macro bend loss is also called as large radius loss.

Term "micro bend loss" as used herein refers to a loss in an optical fiber that relates to an optical signal loss associated with lateral stresses along a length of the optical fiber. The micro bend loss is due to coupling from the optical fiber guided fundamental mode to lossy modes or cladding modes.

Term "Coefficient of Thermal Expansion (CTE)" as used herein refers to a rate at which a material expands with increase in temperature. More specifically, this coefficient is determined at constant pressure and without a phase change, i.e., the material is expected to still be in its solid or fluid form.

Term "Zero Dispersion Wavelength (ZDW)" as used herein refers to a wavelength at which a value of dispersion coefficient is zero. In general, ZDW is a wavelength at which material dispersion and waveguide dispersion cancel one another.

Term "Attenuation" as used herein refers to a reduction in power of an optical signal as it is transmitted. Specifically, the attenuation is caused by passive media components such as cables, cable splices, and connectors.

Term "Crosstalk" as used herein refers to a major impairment of optical communication networks utilizing WDM transmission. Crosstalk in optical networks occurs when the optical power associated with one channel starts appearing in another channel or adjacent channel. In multi-core optical fibers, the crosstalk arises from unwanted coupling between the multiple cores.

Term "Ribbon optical fiber cable" as used herein refers to an optical fiber cable that consists of coated optical fibers which are placed adjacent to each other. Such an arrangement enables individual fibers to be aligned in a single row. The cable ribbons are then impregnated with an acrylate UV curable resin and encapsulated in Mylar tape. As such, these multiple individual optical ribbons allow stacking into a bundle with a matrix structure. They can then be stored in a central core tube or in stranded multi-tubes in the cable core. Additionally, these individual optical ribbons can be stored in two ways: inside a central core tube or in stranded multi-tubes within the cable core.

Term "intermittent bonded ribbon fiber cable" as used herein refers to a ribbon fiber cable that consists of fibers bonded using matrix material. As such, they lack a flat structure. The rollable ribbons in an intermittently bonded ribbon fiber are bundled together and have the appearance of a spider's web. Hence, they are also called spider web ribbon fiber. Due to their loose fiber bundling, intermittently bonded ribbon cables are perfect for making optical fiber cables with higher packing density. Additionally, they can also undergo mass fusion fiber cable splicing which is another advantage for manufacturers.

Term "multi-core optical fiber ribbon" as used herein refers to an optical fiber ribbon in which multiple multi-core optical fibers including the multi-core optical fiber having the structure as disclosed in the present invention are intermittently bonded.

Term "multi-core optical fiber cable" as used herein refers to an optical fiber cable that consists of coated multi-core optical fibers. The multi-core optical fiber ribbon can also be placed in the multi-core optical fiber cable to design a multi-core optical fiber cable with a greater fiber packing density.

Figure 1A:
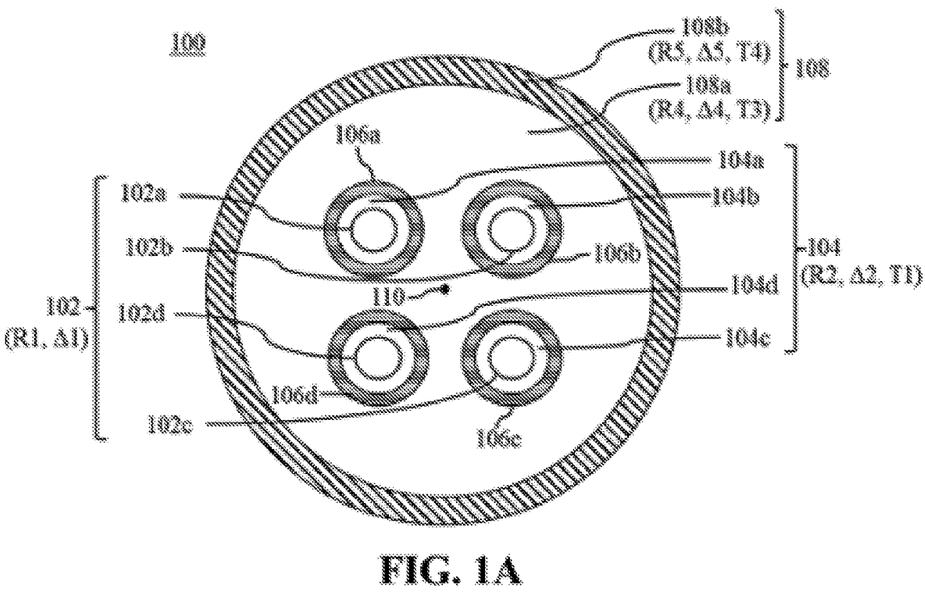
FIG. 1A is a pictorial snapshot illustrating a cross-sectional view of a multi-core optical fiber in accordance with an embodiment of the present invention.

FIG. 1A is a pictorial snapshot illustrating a cross-sectional view of a multi-core optical fiber in accordance with an embodiment of the present invention. The multi-core optical fiber 100 is a reduced diameter multi-core optical fiber with a peripheral cladding. In particular, the multi-core optical fiber 100 is a reduced diameter multi-core optical fiber with a peripheral cladding that is down doped. Moreover, the multi-core optical fiber 100 have a plurality of cores 102 of which first through fourth cores 102a-102d, a plurality of buffer layers 104 of which first through fourth buffer layers 104a-104d are shown, a plurality of trench layers and a cladding 108. Further, the multi-core optical fiber 100 have a central axis 110 such that the plurality of cores 102 are arranged along the central axis 110 running longitudinally parallel to the central axis 110.

In accordance with an embodiment of the present invention, the plurality of cores 102 are arranged in a predefined lattice on the cross-section of the multi-core optical fiber 100 that is perpendicular to an axis extending parallelly along the central axis 110 of the multi-core optical fiber 100. The predefined lattice is a square lattice. Alternatively, the predefined lattice is a hexagonal lattice. In various alternate aspects, the plurality of cores 102 is arranged in any type of the predefined lattice, without deviating from the scope of the present invention.

Each core of the plurality of cores 102 are configured to guide an optical signal. Further, each core of the plurality of cores 102 is a cylindrical fiber that run along a length of the multi-core optical fiber 100 and is made up of a material selected from at least one of, a plastic, a pure silica glass, and the like. Particularly, each core of the plurality of cores 102 is made up of a silica glass doped with a suitable up dopant. Each core of the plurality of cores 102 is up doped with one or more up dopants increases a refractive index of the silica glass.

The dopants is, but not limited to, Aluminum oxide ($Al_2O_3$), Phosphorus pentoxide ($P_2O_5$), Titanium dioxide ($TiO_2$), and the like. Particularly, the up dopant used to increase the refractive index of each core of the plurality of cores 102 is one of, Germanium (Ge) and Chlorine (Cl).

In accordance with an embodiment of the present invention, each core of the plurality of cores 102 have a first radius R1 and a first relative refractive index % Δ1. In particular, the first through fourth cores 102a-102d have the first radius R1 in a range of 3 μm to 5 μm. In one aspect of the present invention, the first radius R1 of each core of the plurality of cores 102 is equal. In another aspect of the present invention, the first radius R1 of each core of the plurality of cores 102 is different. In some aspects of the present invention, the first relative refractive index % Δ1 of each core of the plurality of cores 102 is in a range of 0.32 to 0.55.

In accordance with an embodiment of the present invention, the plurality of buffer layers 104 envelop the plurality of cores 102. In particular, the plurality of buffer layers 104 have the first buffer layer 104a, the second buffer layer 104b, the third buffer layer 104c, and the fourth buffer layer 104d. Moreover, the first buffer layer 104a is provided around an outer periphery of the first core 102a, the second buffer layer 104b is provided around an outer periphery of the second core 102b, the third buffer layer 104c is provided around an outer periphery of the third core 102c, and the fourth buffer layer 104d is provided around an outer periphery of the fourth core 102d. Further, the plurality of buffer layers 104 is undoped layers.

In some aspects of the present invention, the plurality of buffer layers 104 is undoped layers surrounding the plurality of cores 102. In particular, the plurality of buffer layers 104, by virtue of being undoped (i.e., made up of pure silica glass material) facilitates to achieve a delta in reference to each core of the plurality of cores 102 which is required for light to guide in core and to achieve total internal reflection. The pure silica regions surrounding each core acts as a buffer region and these are required to optimize the MFD value in the required range as claimed in the present invention. In absence of this buffer region MFD becomes very low and will be out of range of the claimed value.

In accordance with an embodiment of the present invention, the first through fourth buffer layers 104a-104d facilitates in providing a high effective area by increasing a Mode Field Diameter (MFD) of the multi-core optical fiber 100. In particular, the plurality of buffer layers 104 have same number of buffer layers as the number of cores of the plurality of cores 102 such that each core of the plurality of cores 102 has at least one corresponding buffer layer of the plurality of buffer layers 104, without deviating from the scope of the present invention.

In accordance with an embodiment of the present invention, each buffer layer of the plurality of cores 104 have a second radius R2 and a second relative refractive index % Δ2. The first through fourth buffer layers 104a-104d have the second radius R2 in a range of 4 μm to 7 μm. In one aspect of the present invention, the second radius R2 of each buffer layer of the plurality of buffer layers 104 is equal. Alternatively, the second radius R2 of each buffer layer of the plurality of buffer layers 104 is different.

In accordance with an embodiment of the present invention, each buffer layer of the plurality of buffer layers 104 may have a first thickness T1. The first thickness T1 of the first through fourth buffer layers 104a-104d is in a range of 1 μm to 2 μm. In one aspect of the present invention, the first thickness T1 of each buffer layer of the plurality of buffer layers 104 is equal. Alternatively, the first thickness T1 of each buffer layer of the plurality of buffer layers 104 is different.

In some aspects of the present invention, the second radius R2 first through fourth buffer layers 104a-104d is determined by an equation, i.e., R2=R1+T1. In some aspects of the present invention, the second relative refractive index % Δ2 of each buffer layer of the plurality of buffer layers 104 is in a range of −0.03 to 0.03. Alternatively, the second relative refractive index % Δ2 of each buffer layer of the plurality of buffer layers 104 is 0.

In accordance with an embodiment of the present invention, the trench layers 106a-106d is provided such that the first trench layer 106a envelops an outer periphery of the first buffer layer 104a, the second trench layer 106b envelops an outer periphery of the second buffer layer 104b, the third trench layer 106c envelops an outer periphery of the third buffer layer 104c, and the fourth trench layer 106d envelops an outer periphery of the fourth buffer layer 104d. The first through fourth trench layers 106a-106d is provided between the plurality of cores 102 and the cladding 108. The MFD having a higher value may result into increase in crosstalk due to an overlap between neighbouring cores of the plurality of cores 102. The higher value of MFD with poor confinement of the mode may result into increase in crosstalk. Moreover, the macro and micro bend is increased due to a lower distance between the plurality of cores 102 and a glass boundary. Thus, the first through fourth trench layers 106a-106d is provided to control the crosstalk and the macro and micro bend of the multi-core optical fiber 100.

Further, the MFD may depend on a predefined radius of each buffer layer of the first through fourth buffer layers 104a-104d and a predefined radius of each trench layer of the first through fourth trench layers 106a-106d such that an effective area and the MFD of the multi-core optical fiber 100 increases with an increase in the radius of the first through fourth buffer layers 104a-104d and the first through fourth trench layers 106a-106d. Furthermore, the first through fourth buffer layers 104a-104d along with the first through fourth trench layers 106a-106d may facilitate to increase a confinement of the optical signal, while having a higher value of the MFD, lower crosstalk, and lower micro bend and macro bend losses.

In accordance with an embodiment of the present invention, the role of the first through fourth trench layers 106a-106d is to suppress the optical signal traveling to the cladding 108 and to focus the optical signal into the first through fourth cores 102a-102d to reduce the crosstalk between adjacent cores of the plurality of cores 102. Further, the first through fourth trench layers 106a-106d may facilitate in fabrication of more densely arranged cores in the multi-core optical fiber 100.

In some aspects of the present invention, the first through fourth trench layers 106a-106d is made up of a material such as, but not limited to, a plastic, a pure silica glass, and the like. Preferably, each of the first through fourth trench layers 106a-106d is made up of a silica glass doped with a suitable down dopant. In other words, each of the first through fourth trench layers 106a-106d made up of the silica glass is down doped with one or more down dopants that may decrease a refractive index of the silica glass.

In some aspects of the present invention, the first through fourth trench layers 106a-106d is down doped with Fluorine. Alternatively, the first through fourth trench layers 106a-106d is down doped with any suitable down dopant, without deviating from the scope of the present invention.

In accordance with an embodiment of the present invention, the multi-core optical fiber 100 have four trench layers. Alternatively, the plurality of trench layers 106 have same number of trench layers as the number of buffer layers of the plurality of buffer layers 104 such that each buffer layer of the plurality of buffer layers 104 has at least one corresponding trench layer of the plurality of trench layers 106, without deviating from the scope of the present invention.

In accordance with an embodiment of the present invention, each trench layer of the plurality of trench layers 106 have a third radius R3 and a third relative refractive index % Δ3. In particular, the first through fourth trench layers 106a-106d may have the third radius R3 in a range of 9 μm to 14 μm. In one aspect of the present invention, the third radius R3 of each trench layer of the plurality of trench layers 106 is equal. Alternatively, the third radius R3 of each trench layer of the plurality of trench layers 106 is different.

In accordance with an embodiment of the present invention, each trench layer of the plurality of trench layers 106 may have a second thickness T2 in a range of 5 μm to 7 μm. Alternatively, the second thickness T2 of each trench layer of the plurality of trench layers 106 is equal. In another aspect of the present invention, the second thickness T2 of each trench layer of the plurality of trench layers 106 is different.

In some aspects of the present invention, the third radius R3 of the first through fourth trench layers 106a-106d is determined by an equation, i.e., R3=R2+T2. In some aspects of the present invention, the third relative refractive index % Δ3 of each trench layer of the plurality of trench layers 106 is in a range of −0.41 to −0.62.

In accordance with an embodiment of the present invention, the cladding 108 envelop an outer circumferential surface of the plurality of trench layers 106 (i.e., the first through fourth trench layers 106a-106d). In particular, the cladding 108 have an associated refractive index that is less than the refractive index of each core of the plurality of cores 102. For example, when the refractive index of each core of the plurality of cores 102 is n1 and the refractive index of the cladding 108 is n2, then n2 is less than n1. Further, the cladding 108 may have a mid-cladding layer 108a and a peripheral cladding layer 108b. Specifically, the mid-cladding layer 108a may envelop the outer circumferential surface of the plurality of trench layers 106 (i.e., the first through fourth trench layers 106a-106d) and the peripheral cladding layer 108b may envelop an outer circumferential surface of the mid-cladding layer 108a.

In accordance with an embodiment of the present invention, the mid-cladding layer 108a is made up of a pure silica glass material. Alternatively, the mid-cladding layer 108a is made up of a down doped silica glass material where concentration of down dopant is greater or lesser as compared to concentration of the down dopant in the trench layers 106 and the peripheral cladding layer 108b. Further, the mid-cladding layer 108a is a host material where one or more holes are drilled to insert one or more core rods (not shown) to manufacture the multi-core optical fiber 100. Furthermore, the mid-cladding layer 108a is required to achieve a refractive index difference with respect to the plurality of cores 102 (i.e., an up doped region) to guide the optical signal in each core of the plurality of cores 102.

In some aspects of the present invention, the mid-cladding layer 108a may have a fourth radius R4 and a fourth relative refractive index % Δ4. The fourth radius R4 of the mid-cladding layer 108a is in a range of 35 μm to 46 μm. In some aspects of the present invention, the mid-cladding layer 108a may have a third thickness T3. The third thickness T3 of the mid-cladding layer 108a is in a range of 6 μm to 12 μm. In some aspects of the present invention, the fourth radius R4 of the mid-cladding layer 108a is measured from the central axis 110 of the multi-core optical fiber 100 and is determined by an equation, i.e., In some aspects of the present invention, the fourth relative refractive index % Δ4 of the mid-cladding layer 108a is in a range of −0.03 to 0.03. In one aspect of the present invention, the fourth relative refractive index % Δ4 of the mid-cladding layer 108a is 0.

In accordance with an embodiment of the present invention, the peripheral cladding layer 108b is an outermost cladding region of the multi-core optical fiber 100. The peripheral cladding layer 108b is down doped by using a down dopant. In accordance with an embodiment of the present invention, the down dopant used to down dope the peripheral cladding layer 108b is Fluorine (F). Specifically, the peripheral cladding layer 108b being down doped by using the down dopant may facilitate to achieve a leakage loss that is less than 0.001 Decibel/Kilometer (dB/Km) at a wavelength 1550 nm for the multi-core optical fiber 100. Further, doping the peripheral cladding layer 108b with Fluorine (F) may lower a Coefficient of Thermal Expansion (CTE) value of the peripheral cladding 108b. Specifically, a surface doping of Fluorine (F) in the peripheral cladding layer 108b may facilitate lowering the CTE surface on the silica glass. Thus, the low CTE on the surface may create compressive stress on the surface of the peripheral cladding layer 108b that may further improve the mechanical behavior of the peripheral cladding layer 108b in terms of crack growth and fatigue.

In some aspects of the present invention, the down dopant (such as Fluorine (F)) in the peripheral cladding layer 108b is doped up to 10 mole % (mol %) with the CTE value in a range of $6 \times 10^{-7}$ to $1 \times 10^{-7}$ $C^{-1}$. In one aspect of the present invention, the CTE is less than $1 \times 10^{-7}$ $C^{-1}$.

In accordance with an embodiment of the present invention, the peripheral cladding layer 108b may have a fourth thickness T4 that is in a range of 3 micrometers (μm) to 6 μm. As discussed, the thickness of the peripheral cladding layer 108b is less (i.e., in the range of 3 μm to 6 μm), therefore the peripheral cladding layer 108b is down doped with the down dopant (i.e., Fluorine (F)) to improve a leakage loss and a micro bending loss of the multi-core optical fiber 100. Further, the peripheral cladding layer 108b, by virtue of being down doped by using the down dopant facilitates a mechanical strength of the multi-core optical fiber 100. In particular, the peripheral cladding layer 108b may provide the additional mechanical strength to the multi-core optical fiber 100 (i.e., a reduced diameter multi-core optical fiber).

In some aspects of the present invention, the peripheral cladding layer 108b may have a fifth radius R5 and a fifth relative refractive index % Δ5. The fifth radius R5 of the peripheral cladding layer 108b is measured from the central axis 110 of the multi-core optical fiber 100. The fifth radius R5 of the peripheral cladding layer 108b is in a range of 39 μm to 51 μm. In some aspects of the present invention, the fifth radius R5 of the peripheral cladding layer 108b is determined by an equation, i.e., R5=R4+T4. In some aspects of the present invention, the fifth relative refractive index % Δ5 of the peripheral cladding layer 108b is in a range of −0.07 to −0.21.

In accordance with an embodiment of the present invention, the relative refractive index % (Δi) of ith region of the multi-core optical fiber 100 is determined by an expression $$\Delta i(\%) = \left( \frac{(Ni)^2 - (Nsi)^2}{2 \cdot (Nsi)^2} \cdot 100 \right)$$

where,
Ni is refractive index of ith region such that i=1 for cores 102, i=2 for buffer layers 104, i=3 for trench layers 106, i=4 for mid-cladding layer 108a, and i=5 for peripheral cladding layer 108b.
Nsi is refractive index of pure silica.

In accordance with an embodiment of the present invention, the cladding 108 may have an associated outer cladding thickness (OCT) that may have a predefined value depending on particular application attributes. In an example, the OCT is defined as a distance from the center of any of the cores of the plurality of cores 102 to an interface of the cladding 108 without a coating layer of the multi-core optical fiber 100. In particular, the OCT of the cladding 108 is in a range of 18 μm to 33 μm.

The multi-core optical fiber 100 may further have a coating layer (not shown). The coating layer may have one or more coatings. The thickness of the coating layer (not shown) is in a range of 25 μm to 60 μm. In some aspects of the present invention, the coating layer is made up of an ultraviolet (UV) light curable resin. In particular, the coating layer may have the UV light curable acrylate mixture of monomers, oligomers, photo initiators, and additives, such that the mixtures are cured separately. Alternatively, the one or more coatings of the coating layer is a colored coating.

The multi-core optical fiber 100 has the first through fourth cores 102a-102d. In some aspects of the present invention, the cladding 108 of the multi-core optical fiber 100 have a diameter that is equal to 80+/−1 μm such that a core to core spacing between each pair of adjacent cores of the first through fourth cores 102a-102d is in a range of 20 μm to 30 μm. Further, when the diameter of the cladding 108 of the multi-core optical fiber 100 is 80+/−1 μm, the first relative refractive index % Δ1 of the core 102 of the multi-core optical fiber 100 is in a range of 0.34 to 0.55, the first radius R1 of the of the core 102 is in a range of 3 μm to 5 μm, the second relative refractive index % Δ2 of the buffer layer 104 is in a range of −0.03 to 0.03, the first thickness T1 of the buffer layer 104 is in a range of 1 μm to 2 μm, the third relative refractive index % Δ3 of the trench layer 106 is in a range of −0.48 to −0.62, the second thickness T2 of the trench layer 106 is in a range of 5 μm to 7 μm, the fourth relative refractive index % Δ4 of the mid-cladding layer 108a is in a range of −0.03 to 0.03, the third thickness T3 of the mid-cladding layer 108a is in a range of 6 μm to 9 μm, and the fifth relative refractive index % Δ5 is in range of −0.07 to −0.21, and the fourth thickness T4 of the peripheral cladding layer 108b is in a range of 3 μm to 5 μm.

In accordance with an embodiment of the present invention, when the diameter of the cladding 108 of the multi-core optical fiber 100 is 80+/−1 μm, the first relative refractive index % Δ1 of the core 102 of the multi-core optical fiber 100 is 0.38, the first radius R1 of the of the core 102 is 4 μm, the second relative refractive index % Δ2 of the buffer layer 104 is 0, the first thickness T1 of the buffer layer 104 is 1.5 μm, the third relative refractive index % Δ3 of the trench layer 106 is −0.55, the second thickness T2 of the trench layer 106 may 5 μm, the fourth relative refractive index % Δ4 of the mid-cladding layer 108a is 0, the third thickness T3 of the mid-cladding layer 108a is 8 μm, and the fifth relative refractive index % Δ5 is −0.21, and the fourth thickness T4 of the peripheral cladding 108b is 5 μm.

In another aspect of the present invention, when the diameter of the cladding 108 of the multi-core optical fiber 100 is 80+/−1 μm, the first relative refractive index % Δ1 of the core 102 of the multi-core optical fiber 100 is 0.45, the first radius R1 of the of the core 102 is 4.5 μm, the second relative refractive index % Δ2 of the buffer layer 104 is 0, the first thickness T1 of the buffer layer 104 is 1.2 μm, the third relative refractive index % Δ3 of the trench layer 106 is −0.6, the second thickness T2 of the trench layer 106 may 6 μm, the fourth relative refractive index % Δ4 of the mid-cladding layer 108a is 0, the third thickness T3 of the mid-cladding layer 108a is 7 μm, and the fifth relative refractive index % Δ5 is −0.17, and the fourth thickness T4 of the peripheral cladding 108b is 4 μm.

In accordance with an embodiment of the present invention, when the diameter of the cladding 108 of the multi-core optical fiber 100 is 80+/−1 μm, the first relative refractive index % Δ1 of the core 102 of the multi-core optical fiber 100 is 0.41, the first radius R1 of the of the core 102 is 4.5 μm, the second relative refractive index % Δ2 of the buffer layer 104 is 0, the first thickness T1 of the buffer layer 104 is 1.3 μm, the third relative refractive index % Δ3 of the trench layer 106 is −0.6, the second thickness T2 of the trench layer 106 may 7 μm, the fourth relative refractive index % Δ4 of the mid-cladding layer 108a is 0, the third thickness T3 of the mid-cladding layer 108a is 8 μm, and the fifth relative refractive index % Δ5 is −0.12, and the fourth thickness T4 of the peripheral cladding 108b is 3 μm.

In accordance with an embodiment of the present invention, the cladding 108 of the multi-core optical fiber 100 have a diameter that is equal to 100+/−1 μm such that a core to core spacing (i.e., a pitch) between each pair of adjacent cores of the first through fourth cores 102a-102d is in a range of 25 μm to 35 μm. In one aspect of the present invention, the plurality of cores 102 have at least 4 cores (i.e., the first through fourth cores 102a-102d) such that the core to core spacing (i.e., the pitch) of each pair of cores of the plurality of cores 102 is in a range of 20 μm to 35 μm. Further, when the diameter of the cladding 108 of the multi-core optical fiber 100 is 100+/−1 μm, the first relative refractive index % Δ1 of the core 102 of the multi-core optical fiber 100 is in a range of 0.32 to 0.48, the first radius R1 of the of the core 102 is in a range of 3 μm to 5 μm, the second relative refractive index % Δ2 of the buffer layer 104 is in a range of −0.03 to 0.03, the first thickness T1 of the buffer layer 104 is in a range of 1 μm to 2 μm, the third relative refractive index % Δ3 of the trench layer 106 is in a range of −0.41 to −0.55, the second thickness T2 of the trench layer 106 is in a range of 5 μm to 7 μm, the fourth relative refractive index % Δ4 of the mid-cladding layer 108a is in a range of −0.03 to 0.03, the third thickness T3 of the mid-cladding layer 108a is in a range of 10 μm to 12 μm, the fifth relative refractive index % Δ5 is in range of −0.07 to −0.21, and the fourth thickness T4 of the peripheral cladding 108b is in a range of 4 µm to 6 µm.

In accordance with an embodiment of the present invention, when the diameter of the cladding 108 of the multi-core optical fiber 100 is 100+/−1 µm, the first relative refractive index % Δ1 of the core 102 of the multi-core optical fiber 100 is 0.32, the first radius R1 of the of the core 102 is 4 µm, the second relative refractive index % Δ2 of the buffer layer 104 is 0, the first thickness T1 of the buffer layer 104 is 2 µm, the third relative refractive index % 43 of the trench layer 106 is −0.45, the second thickness T2 of the trench layer 106 is 6 µm, the fourth relative refractive index % Δ4 of the mid-cladding layer 108a is 0, the third thickness T3 of the mid-cladding layer 108a is 12 µm, and the fifth relative refractive index % Δ5 is −0.1, and the fourth thickness T4 of the peripheral cladding 108b is 6 µm.

In accordance with an embodiment of the present invention, when the diameter of the cladding 108 of the multi-core optical fiber 100 is 100+/−1 µm, the first relative refractive index % Δ1 of the core 102 of the multi-core optical fiber 100 is 0.45, the first radius R1 of the of the core 102 is 4.5 µm, the second relative refractive index % Δ2 of the buffer layer 104 is 0, the first thickness T1 of the buffer layer 104 is 1 µm, the third relative refractive index % Δ3 of the trench layer 106 is −0.45, the second thickness T2 of the trench layer 106 may 6 µm, the fourth relative refractive index % Δ4 of the mid-cladding layer 108a is 0, the third thickness T3 of the mid-cladding layer 108a is 11 µm, and the fifth relative refractive index % Δ5 is −0.14, and the fourth thickness T4 of the peripheral cladding 108b is 4 µm.

In accordance with an embodiment of the present invention, when the diameter of the cladding 108 of the multi-core optical fiber 100 is 100+/−1 µm, the first relative refractive index % Δ1 of the core 102 of the multi-core optical fiber 100 is 0.45, the first radius R1 of the of the core 102 is 4.5 µm, the second relative refractive index % Δ2 of the buffer layer 104 is 0, the first thickness T1 of the buffer layer 104 is 1.3 µm, the third relative refractive index % Δ3 of the trench layer 106 is −0.52, the second thickness T2 of the trench layer 106 may 7 µm, the fourth relative refractive index % Δ4 of the mid-cladding layer 108a is 0, the third thickness T3 of the mid-cladding layer 108a is 12 µm, and the fifth relative refractive index % Δ5 is −0.15, and the fourth thickness T4 of the peripheral cladding 108b is 5 µm.

In accordance with an embodiment of the present invention, the multi-core optical fiber 100 may further have (i) a crosstalk of less than −30 Decibel (dB) at a wavelength of 1550 nanometers, (ii) a Zero Dispersion Wavelength (ZDW) in a range of 1290 nm to 1350 nm, (iii) a cable cutoff (CC) of less than 1260 nm, (iv) a Mode Field Diameter (MFD) of 8.1+/−0.5 µm at the wavelength of 1550 nm.

In accordance with an embodiment of the present invention, the MFD is in a range of 7.6 µm to 8.6 µm at the wavelength of 1550 nm, a macro bend loss of the multi-core optical fiber 100 (i) at a wavelength of 1550 nm and a bend radius of 5 mm is less than or equal to 0.15 dB/turn, (ii) at a wavelength of 1625 nm and at a bend radius of 5 mm is less than or equal to 0.45 dB/turn, (iii) at a wavelength of 1550 nm and a bend radius of 7.5 mm is less than or equal to 0.08 dB/turn, and (iv) at a wavelength of 1625 and a bend radius of 7.5 mm is less than or equal to 0.025 dB/turn. And an attenuation is (i) less than 0.35 dB/KM at 1310 nm wavelength and (ii) less than 0.25 dB/KM at 1550 nm wavelength.

In accordance with an embodiment of the present invention, the multi-core optical fiber 100 may have the coating layer. In particular, the coating layer may have a diameter that is in a range of 150 µm to 200 µm. Moreover, a diameter of the multi-core optical fiber 100 with the coating layer is in the range of 150 µm to 200 µm. Further, without the coating layer, the multi-core optical fiber 100 may have a diameter in a range of 80 µm to 110 µm with a tolerance of ±1 µm.

Figure 1B:
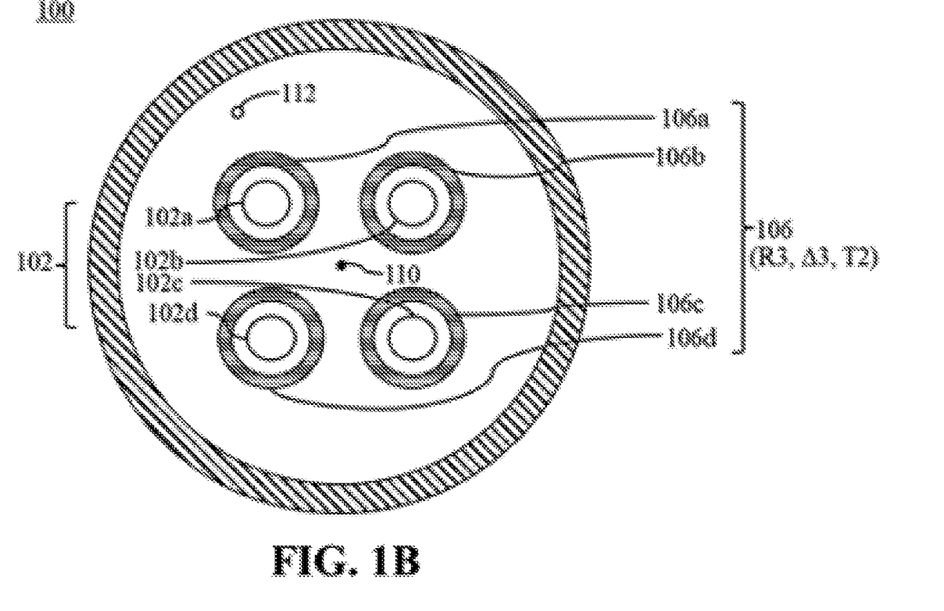
FIG. 1B is a pictorial snapshot illustrating another cross-sectional view of the multi-core optical fiber in accordance with an embodiment of the present invention.

FIG. 1B is a pictorial snapshot illustrating another cross-sectional view of the multi-core optical fiber in accordance with an embodiment of the present invention. The mid-cladding layer 108a may have a marker 112 facilitating to identify a position of the plurality of cores 102. In particular, the marker 112 is disposed in the mid-cladding layer 108a along the central axis 110 running longitudinally, i.e., generally parallel to the central axis 110 and the plurality of cores 102. Moreover, the marker 112 has an associated refractive index that is different from the fourth relative refractive index % Δ4 of the mid-cladding layer 108a. Further, the refractive index of the marker 112 is greater than the fourth relative refractive index % Δ4 of the mid-cladding layer 108a. The refractive index of the marker 112 is less than the fourth relative refractive index % Δ4 of the mid-cladding layer 108a.

Figure 1C:
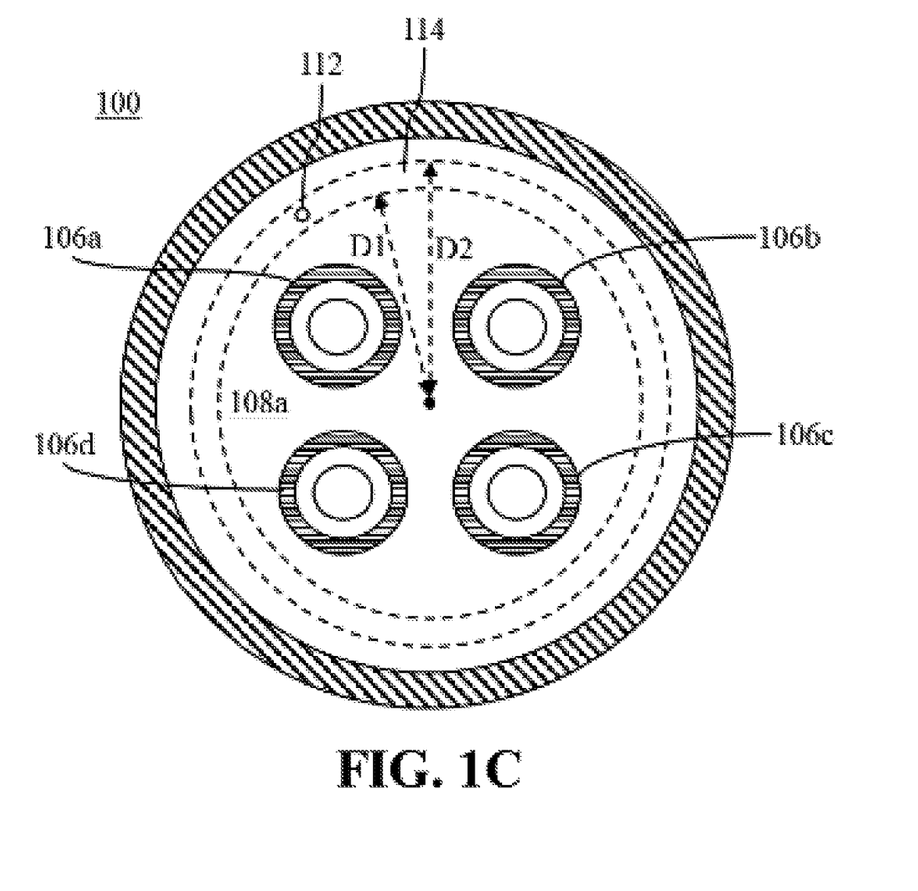
FIG. 1C is a pictorial snapshot illustrating yet another cross-sectional view of the multi-core optical fiber in accordance with an embodiment of the present invention.

FIG. 1C is a pictorial snapshot illustrating yet another cross-sectional view of the multi-core optical fiber in accordance with an embodiment of the present invention. The mid-cladding layer 108a may have the marker 112 disposed in the mid-cladding layer 108a. In particular, the marker 112 is disposed within a marker space 114. Moreover, the marker space 114 may surround the first through fourth trench layers 106a-106d and is defined between the first and second distances D1 and D2, respectively. Further, the marker 112 is disposed between the first distance D1 and the second distance D2 i.e., 20 µm to 37.5 µm from a central axis 110 of the multi-core optical fiber 100. The marker 112 may have a shape such as, but not limited to, a circular shape, a cylindrical shape, an elliptical cylindrical shape, a triangular cylindrical shape, and the like.

Figure 1D:
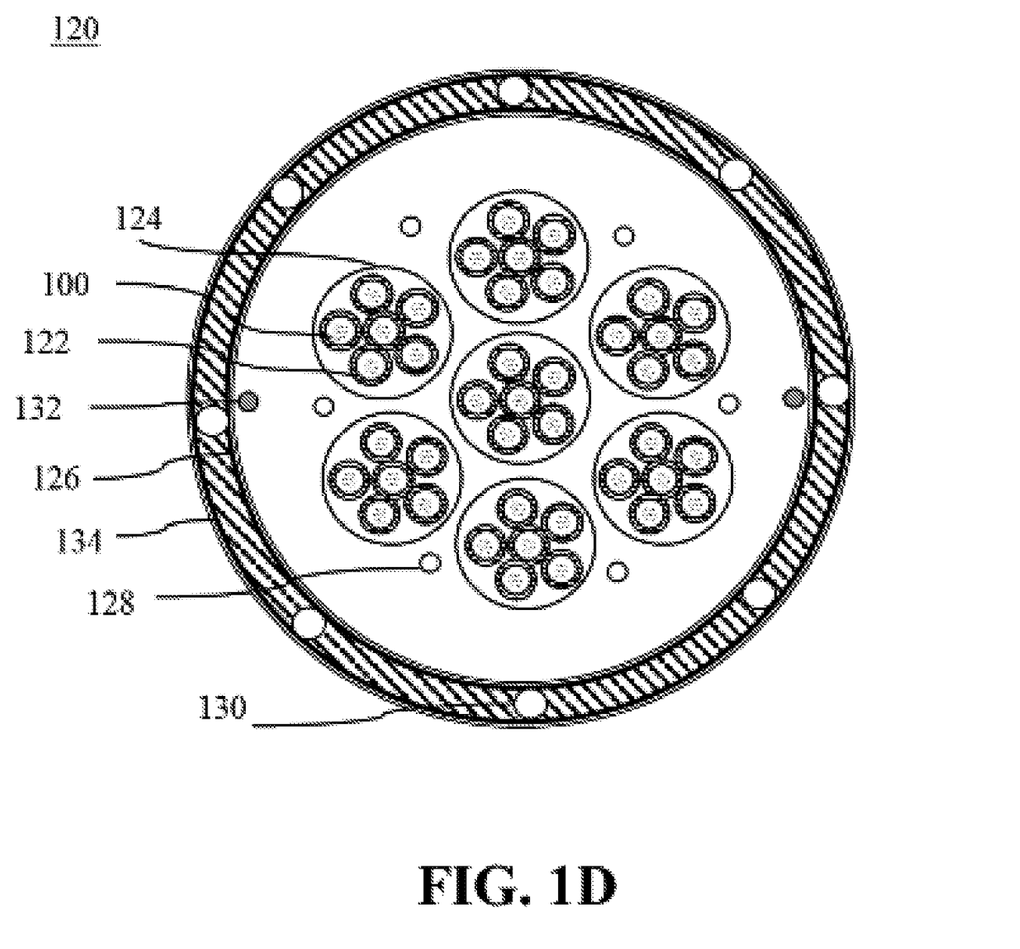
FIG. 1D is a pictorial snapshot illustrating a cross-sectional view of a multi-core optical fiber cable in accordance with an embodiment of the present invention.

FIG. 1D is a pictorial snapshot illustrating a cross-sectional view of a multi-core optical fiber cable in accordance with an embodiment of the present invention. The multi-core optical fiber cable 120 may incorporate a bundle 124 of multi-core optical fiber ribbon 122 in which a plurality of multi-core optical fibers 100 are intermittently bonded. In particular, the multi-core optical fiber cable 120 comprises one or more multi-core optical fiber ribbons 122, one or more water blocking tapes 126, one or more water swellable yarns 128, one or more strength members 130, one or more rip cords 132, and an outer sheath 134. Moreover, the multi-core optical fiber 100 are reduced in diameter i.e., in a range of 80 to 110 µm, significantly increases a packing density of the multi-core optical fiber cable 120. Further, the reduced diameter of the multi-core optical fiber 100 allow incorporation of higher number of the multi-core optical fiber 100 in the multi-core optical fiber cable 120. The multi-core optical fiber ribbon 122 incorporated in the multi-core optical fiber cable 120 is spirally twisted.

In some aspects of the present invention, the multi-core optical fiber cable 120 has an attenuation of less than 0.4 dB/km at a wavelength 1310 nm. Alternatively, the multi-core optical fiber cable 120 has an attenuation of less than 0.3 dB/km at a wavelength 1550 nm. The minimum average bending radius of the multi-core optical fiber cable 120 is in a range of 10 to 15 times of a predefined diameter (generally 12.5 mm) of the multi-core optical fiber cable 120 in the longitudinal direction.

Figure 2A:
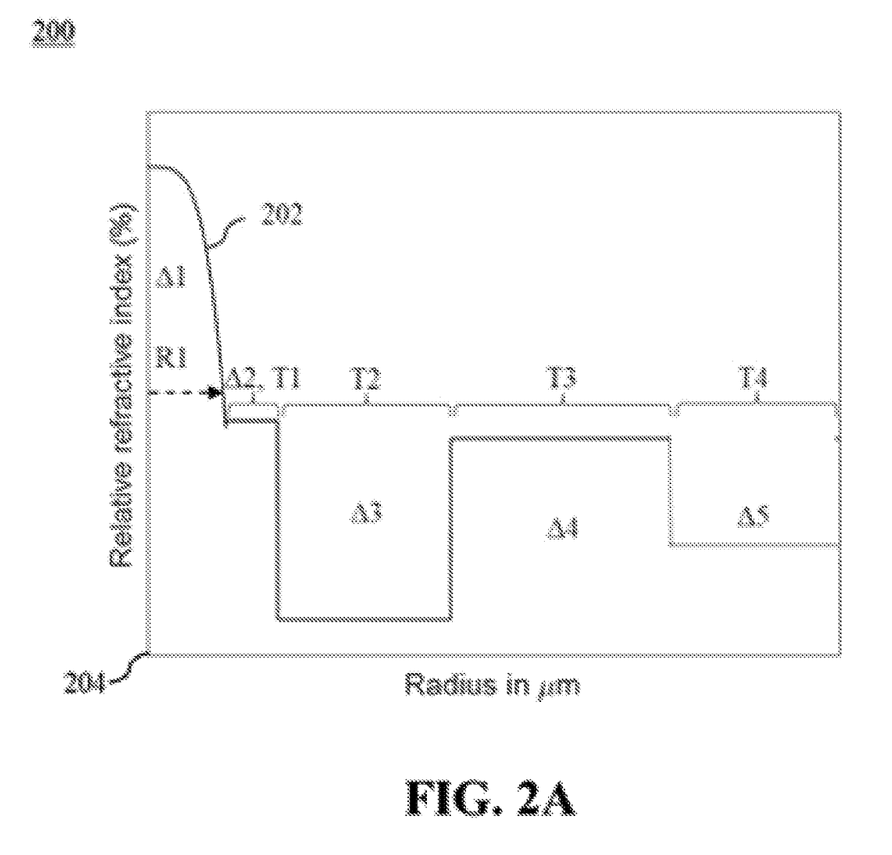
FIG. 2A is a graphical representation of a refractive index (RI) profile of the multi-core optical fiber in accordance with an embodiment of the present invention.

FIG. 2A is a graphical representation of a refractive index (RI) profile of the multi-core optical fiber in accordance with an embodiment of the present invention. The X-axis and Y-axis of the graph 200 denote various radiuses and thickness associated with the multi-core optical fiber 100 and various relative refractive index percentages associated with the multi-core optical fiber 100, respectively. The graph 200 has a curve 202 and a central axis 204 of the plurality of core 102. The curve 202, near the central axis of the plurality of core 102, the first relative refractive index % Δ1 of the plurality of cores 102 is maximum. Further, as the first radius R1 associated with the core 102 increases i.e., moving away from the central axis 204 of the core 102, the first relative refractive index % Δ1 of the core 100 dips. In particular, the first relative refractive index % Δ1 of the core 102 is minimum near a transition point between the core 102 and the plurality of buffer layers 104. Further, the buffer layer 104 has the first thickness T1, the second radius R2 and the second relative refractive index % Δ2 that is linear. Furthermore, the second relative refractive index % Δ2 is less than the first relative refractive index % Δ1 of the core 102.

And, the plurality of trench layers 106 have the second thickness T2, the third radius R3 and the third relative refractive index % Δ3. Further, the third relative refractive index % Δ3 is less than the second relative refractive index % Δ2 of the buffer layer 104. Furthermore, as illustrated, the mid-cladding layer 108a may have the third thickness T3, the fourth radius R4 and the fourth relative refractive index % Δ4 that is linear. However, the fourth relative refractive index % Δ4 of the mid-cladding layer 108a is greater than the third relative refractive index % Δ3 of the trench layer 106 and less than the second relative refractive index % Δ2 of the buffer layer 104.

The peripheral cladding layer 108b may have the fourth thickness T4, the fifth radius R5 and the fifth relative refractive index % Δ5. However, the fifth relative refractive index % Δ5 of the peripheral cladding layer 108b is greater than the third relative refractive index % Δ3 of the trench layer 106 and less than the fourth relative refractive index % Δ4 of the mid-cladding layer 108a. The first radius R1, the second radius R2 and the third radius R3 are measured from the central axis 204 of the core 102. The fourth radius R4 and the fifth radius R5 are measured from the central axis 110 of the multi-core optical fiber 100.

Figure 2B:
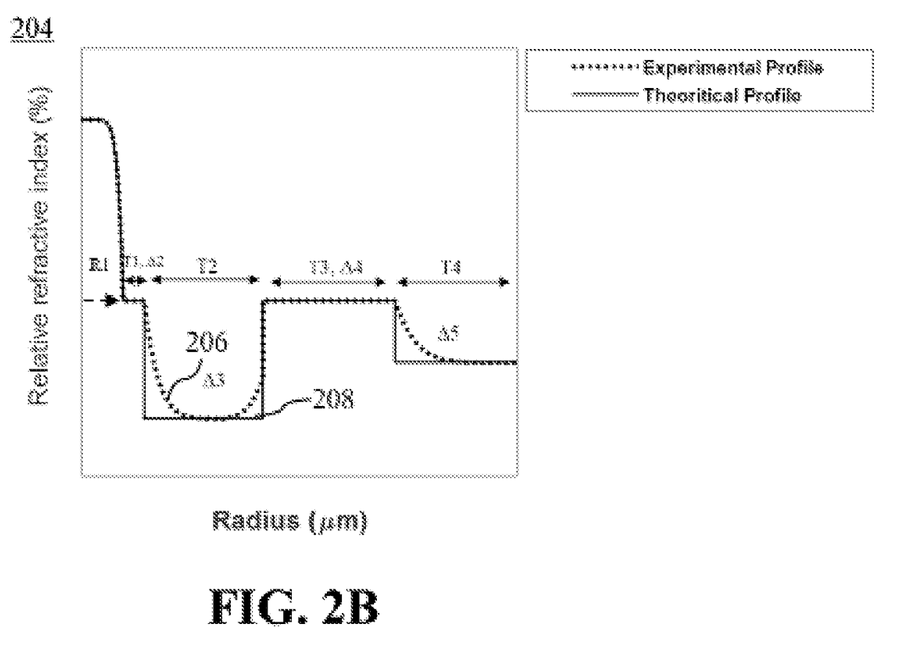
FIG. 2B is a graphical representation of an experimental profile and a theoretical profile of the multi-core optical fiber in accordance with an embodiment of the present invention.

FIG. 2B is a graphical representation of an experimental profile and a theoretical profile of the multi-core optical fiber in accordance with an embodiment of the present invention. X-axis and Y-axis of the graph 204 denote various radiuses and thickness associated with the multi-core optical fiber 100 and various refractive index percentages associated with the multi-core optical fiber 100, respectively. The graph 204 has a first curve 206 and a second curve 208. In particular, the first curve 206 represents the experimental profile of the multi-core optical fiber 100. And, the second curve 208 represents the theoretical profile of the multi-core optical fiber 100. Further, the second curve 208 of the graph 204 is substantially similar to the curve 202 of the graph 200.

Figure 3A:
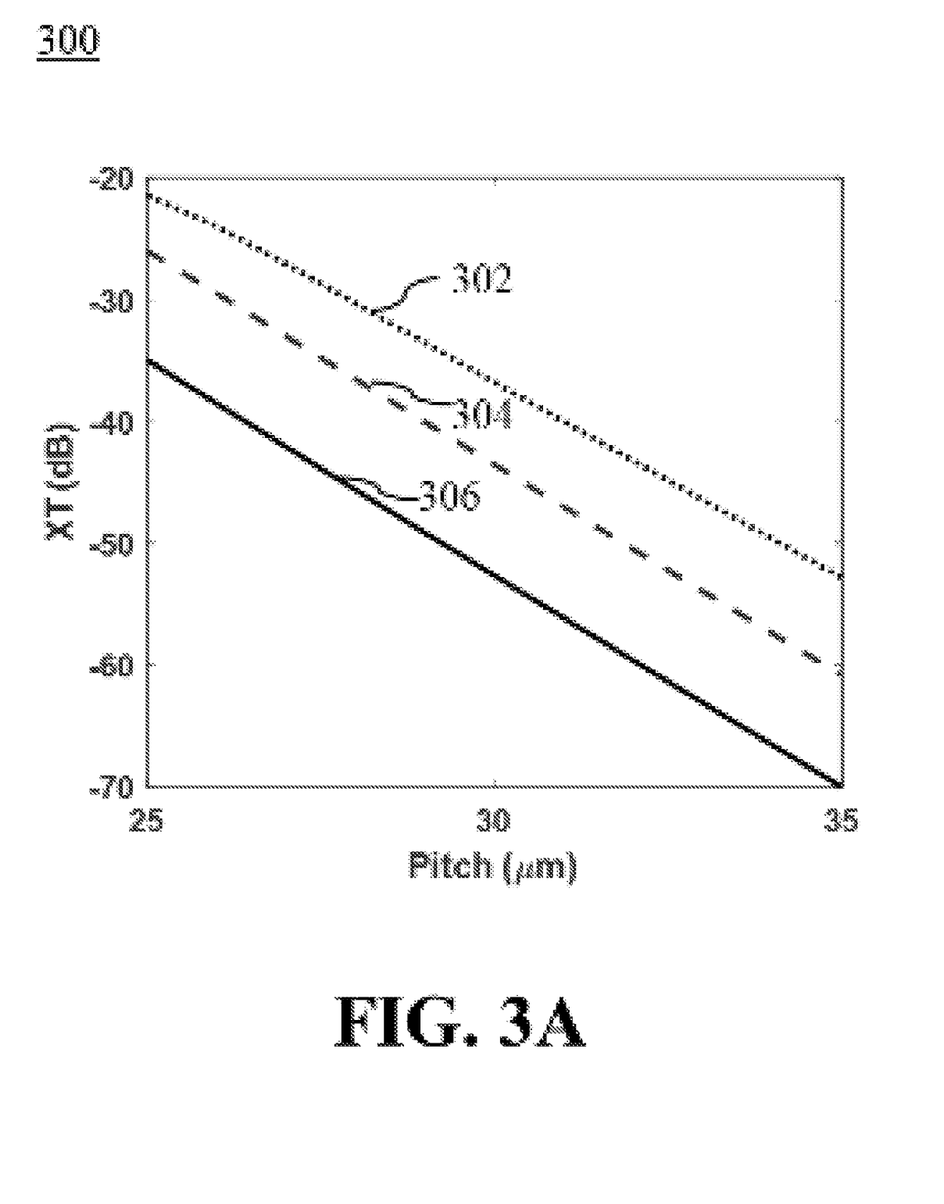
FIG. 3A is graphical representation of a cross talk versus pitch of the multi-core optical fiber in accordance with an embodiment of the present invention.

FIG. 3A is graphical representation of a cross talk versus pitch of the multi-core optical fiber in accordance with an embodiment of the present invention. X-axis and Y-axis of the graph 300 denotes various pitch associated with the multi-core optical fiber 100 and various cross talks associated with the multi-core optical fiber 100, respectively. The graph 300 has the first curve 302, the second curve 304, and the third curve 306.

Particularly, the first curve 302 is a cross talk versus pitch curve of the multi-core optical fiber 100 when the diameter of the cladding 108 of the multi-core optical fiber 100 is 100+/−1 μm, the first relative refractive index % Δ1 of the core 102 of the multi-core optical fiber 100 is 0.32, the first radius R1 of the of the core 102 is 4 μm, the second relative refractive index % Δ2 of the buffer layer 104 is 0, the first thickness T1 of the buffer layer 104 is 2 μm, the third relative refractive index % Δ3 of the trench layer 106 is −0.45, the second thickness T2 of the trench layer 106 is 6 μm, the fourth relative refractive index % Δ4 of the mid-cladding layer 108a is 0, the third thickness T3 of the mid-cladding layer 108a is 12 μm, and the fifth relative refractive index % Δ5 is −0.1, and the fourth thickness T4 of the peripheral cladding 108b is 6 μm.

Moreover, the second curve 304 is a cross talk versus pitch curve of the multi-core optical fiber 100, when the diameter of the cladding 108 of the multi-core optical fiber 100 is 100+/−1 μm, the first relative refractive index % Δ1 of the core 102 of the multi-core optical fiber 100 is 0.45, the first radius R1 of the of the core 102 is 4.5 μm, the second relative refractive index % Δ2 of the buffer layer 104 is 0, the first thickness T1 of the buffer layer 104 is 1 μm, the third relative refractive index % Δ3 of the trench layer 106 is −0.45, the second thickness T2 of the trench layer 106 may 6 μm, the fourth relative refractive index % Δ4 of the mid-cladding layer 108a is 0, the third thickness T3 of the mid-cladding layer 108a is 11 μm, and the fifth relative refractive index % Δ5 is −0.14, and the fourth thickness T4 of the peripheral cladding 108b is 4 μm.

Further, the third curve 306 is a cross talk versus pitch curve of the multi-core optical fiber 100, when the diameter of the cladding 108 of the multi-core optical fiber 100 is 100+/−1 μm, the first relative refractive index % Δ1 of the core 102 of the multi-core optical fiber 100 is 0.45, the first radius R1 of the of the core 102 is 4.5 μm, the second relative refractive index % Δ2 of the buffer layer 104 is 0, the first thickness T1 of the buffer layer 104 is 1.3 μm, the third relative refractive index % Δ3 of the trench layer 106 is −0.52, the second thickness T2 of the trench layer 106 may 7 μm, the fourth relative refractive index % Δ4 of the mid-cladding layer 108a is 0, the third thickness T3 of the mid-cladding layer 108a is 12 μm, and the fifth relative refractive index % Δ5 is −0.15, and the fourth thickness T4 of the peripheral cladding 108b is 5 μm.

Figure 3B:
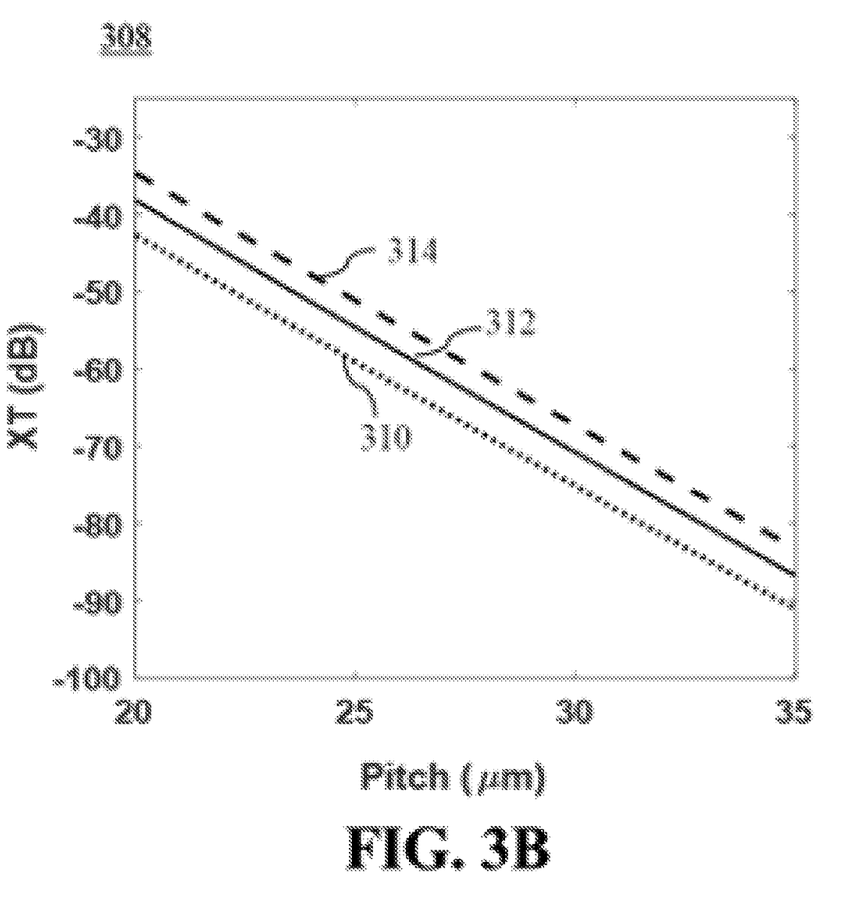
FIG. 3B is graphical representation of a cross talk versus pitch of the multi-core optical fiber in accordance with an embodiment of the present invention.

FIG. 3B is graphical representation of a cross talk versus pitch of the multi-core optical fiber in accordance with an embodiment of the present invention. X-axis and Y-axis of the graph 308 denote various pitches associated with the multi-core optical fiber 100 and various cross talks associated with the multi-core optical fiber 100, respectively. The graph 308 has the first curve 310, the second curve 312, and the third curve 314. The first curve 310 is a cross talk versus pitch curve of the multi-core optical fiber 100 when the diameter of the cladding 108 of the multi-core optical fiber 100 is 80+/−1 μm, the first relative refractive index % Δ1 of the core 102 of the multi-core optical fiber 100 is 0.38, the first radius R1 of the of the core 102 is 4 μm, the second relative refractive index % Δ2 of the buffer layer 104 is 0, the first thickness T1 of the buffer layer 104 is 1.5 μm, the third relative refractive index % Δ3 of the trench layer 106 is −0.55, the second thickness T2 of the trench layer 106 may 5 μm, the fourth relative refractive index % Δ4 of the mid-cladding layer 108a is 0, the third thickness T3 of the mid-cladding layer 108a is 8 μm, and the fifth relative refractive index % Δ5 is −0.21, and the fourth thickness T4 of the peripheral cladding 108b is 5 μm.

The second curve 312 is a cross talk versus pitch curve of the multi-core optical fiber 100 when the diameter of the cladding 108 of the multi-core optical fiber 100 is 80+/−1

μm, the first relative refractive index % Δ1 of the core 102 of the multi-core optical fiber 100 is 0.45, the first radius R1 of the of the core 102 is 4.5 μm, the second relative refractive index % Δ2 of the buffer layer 104 is 0, the first thickness T1 of the buffer layer 104 is 1.2 μm, the third relative refractive index % Δ3 of the trench layer 106 is –0.6, the second thickness T2 of the trench layer 106 may 6 μm, the fourth relative refractive index % Δ4 of the mid-cladding layer 108a is 0, the third thickness T3 of the mid-cladding layer 108a is 7 μm, and the fifth relative refractive index % Δ5 is –0.17, and the fourth thickness T4 of the peripheral cladding 108b is 4 μm.

Further, the third curve 314 is a cross talk versus pitch curve of the multi-core optical fiber 100 when the diameter of the cladding 108 of the multi-core optical fiber 100 is 80+/–1 μm, the first relative refractive index % Δ1 of the core 102 of the multi-core optical fiber 100 is 0.41, the first radius R1 of the of the core 102 is 4.5 μm, the second relative refractive index % Δ2 of the buffer layer 104 is 0, the first thickness T1 of the buffer layer 104 is 1.3 μm, the third relative refractive index % Δ3 of the trench layer 106 is –0.6, the second thickness T2 of the trench layer 106 may 7 μm, the fourth relative refractive index % Δ4 of the mid-cladding layer 108a is 0, the third thickness T3 of the mid-cladding layer 108a is 8 μm, and the fifth relative refractive index % Δ5 is –0.12, and the fourth thickness T4 of the peripheral cladding 108b is 3 μm.

Advantageously, the multi-core optical fiber 100 of the present invention has a reduced leakage loss and reduced micro bending loss necessary for a multi-core optical fiber due to low thickness of the peripheral cladding layer 108b and cladding 108 of the multi-core optical fiber 100. Moreover, the multi-core optical fiber 100 may have an increased strength by virtue of the peripheral down doped cladding layer 108b which is critical for a reduced diameter optical fiber such as the multi-core optical fiber 100. Further, the buffer layer 104 that is made up of a pure silica glass material may facilitate the multi-core optical fiber 100 to achieve a delta value (i.e., relative refractive index value) that is in reference to the core 102 to require the optical signal to guide in the core 102 to achieve total internal reflection.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

In a case that no conflict occurs, the embodiments in the present invention and the features in the embodiments are mutually combined. The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed for:
1. A multi-core optical fiber (100) comprising:
a plurality of cores (102);
a plurality of buffer layers (104) surrounding the plurality of cores (102), wherein the plurality of buffer layers (104) are undoped, wherein the plurality of buffer layers (104) has a first thickness (T1) in a range of 1 μm to 2 μm;
a plurality of trench layers (106) surrounding the plurality of buffer layers (104), wherein the plurality of trench layers (106) are down doped; and
a cladding (108) that surrounds the plurality of cores (102), wherein the cladding (108) comprising a peripheral cladding layer (108b),
wherein the peripheral cladding layer (108b) is down doped such that a leakage loss of the multi-core optical fiber (100) is less than 0.001 dB/Km at a wavelength 1550 nm, wherein a diameter of the multi-core optical fiber (100) without a coating layer is in a range of 80 micrometres (μm) to 100 μm with a tolerance of ±1 μm.

2. The multi-core optical fiber (100) of claim 1, wherein the cladding (108) comprises a mid-cladding layer (108a) made up of pure silica glass.

3. The multi-core optical fiber (100) of claim 1, wherein a crosstalk of the multi-core optical fiber (100) is less than –30 dB at a wavelength of 1550 nm.

4. A multi-core optical fiber cable (120) incorporates one or more multi-core optical fiber ribbon (122) in which a plurality of multi-core optical fibers (100) are intermittently bonded, and the multi-core optical fiber ribbon (122) is incorporated with spirally twisted, wherein each multi-core optical fibers (100) of the plurality of multi-core optical fibers (100) comprising:
a plurality of cores (102);
a plurality of buffer layers (104) surrounding the plurality of cores (102), wherein the plurality of buffer layers (104) are undoped, wherein the plurality of buffer layers (104) has a first thickness (T1) in a range of 1 μm to 2 μm;
a plurality of trench layers (106) surrounding the plurality of buffer layers (104), wherein the plurality of trench layers (106) are down doped; and
a cladding (108) that surrounds the plurality of cores (102), wherein the cladding (108) comprising a peripheral cladding layer (108 b),
wherein the peripheral cladding layer (108 b) is down doped, wherein a diameter of the multi-core optical fiber (100) without a coating layer is in a range of 80 micrometres (μm) to 100 μm with a tolerance of ±1 μm, wherein the multi-core optical fiber cable (120) has an attenuation of less than 0.3 dB/km at a wavelength 1550 nm.

5. The multi-core optical fiber (100) of claim 1, wherein the plurality of cores (102) are up doped with an up dopant.

6. The multi-core optical fiber (100) of claim 5, wherein the up dopant is one of Germanium (Ge) and Chlorine (Cl).

7. The multi-core optical fiber of claim 1, wherein the peripheral cladding layer (108b) is down doped with a down dopant, and the down dopant is Fluorine (F).

8. The multi-core optical fiber (100) of claim 1, wherein a diameter of the multi-core optical fiber (100) with a coating layer is in a range of 150 μm to 200 μm.

9. The multi-core optical fiber (100) of claim 1, wherein the peripheral cladding layer (108b) has a thickness in a range of 3 μm to 6 μm.

10. The multi-core optical fiber (100) of claim 1, wherein at least one of:
- a Mode Field Diameter (MFD) of the multi-core optical fiber (100) is in a range of 7.6 μm to 8.6 μm at a wavelength of 1550 nm;
- a macro bend loss of the multi-core optical fiber (100)
  (i) at a wavelength of 1550 nm and a bend radius of 5 mm is 0.15 dB/turn,
  (ii) at a wavelength of 1625 nm and at a bend radius of 5 mm is 0.45 dB/turn,
  (iii) at a wavelength of 1550 nm and a bend radius of 7.5 mm is 0.08 dB/turn, and
  (iv) at a wavelength of 1625 and a bend radius of 7.5 mm is 0.025 dB/turn;
- a Coefficient of Thermal Expansion (CTE) is in a range of 6×10−7 to 1×107 C−1; and
- an attenuation is
  (i) less than 0.35 dB/KM at 1310 nm wavelength and
  (ii) less than 0.25 dB/KM at 1550 nm wavelength.

11. The multi-core optical fiber (100) of claim 2, wherein the mid-cladding layer (108a) comprising a marker (112) such that a refractive index of the marker (112) is at least one of higher and lower with respect to a refractive index of the mid-cladding layer (108a).

12. The multi-core optical fiber (100) of claim 2, wherein a marker (112) is disposed at a distance between 20 μm to 37.5 μm from a central axis (110) of the multi-core optical fiber (100).

13. The multi-core optical fiber (100) of claim 12, wherein a shape of the marker (112) is one of, a circular shape, a cylindrical shape, an elliptical cylindrical shape, and a triangular cylindrical shape.

14. The multi-core optical fiber (100) of claim 1, wherein the multi-core optical fiber (100) (100) has at least 4 cores such that a core to core spacing of each pair of cores of the plurality of cores (102) is in a range of 20 μm to 35 μm.

15. The multi-core optical fiber cable (120) of claim 4, wherein the multi-core optical fiber cable (120) has an attenuation of less than 0.4 dB/km at a wavelength 1310 nm.

16. The multi-core optical fiber cable (120) of claim 4, wherein the multi-core optical fiber cable (120) a minimum average bending radius that is 10 to 15 times of a predefined diameter of the multi-core optical fiber cable (120) in a fiber longitudinal direction.

* * * * *